No. 715,082. Patented Dec. 2, 1902.
L. I. JONES.
BICYCLE SUPPORT.
(Application filed June 9, 1902.)
(No Model.)
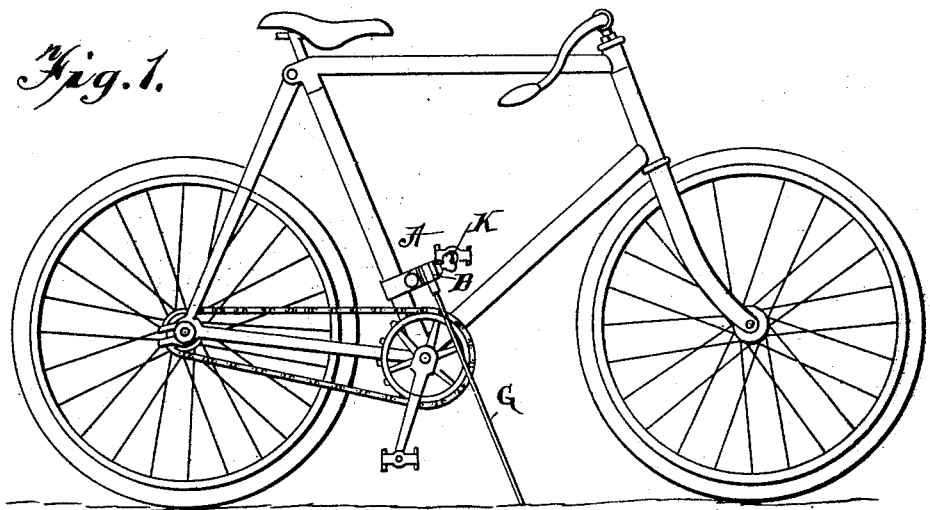
Fig. 1.
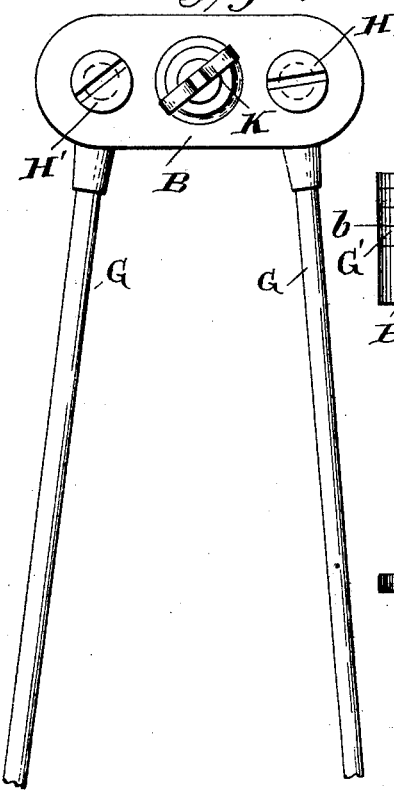
Fig. 2.
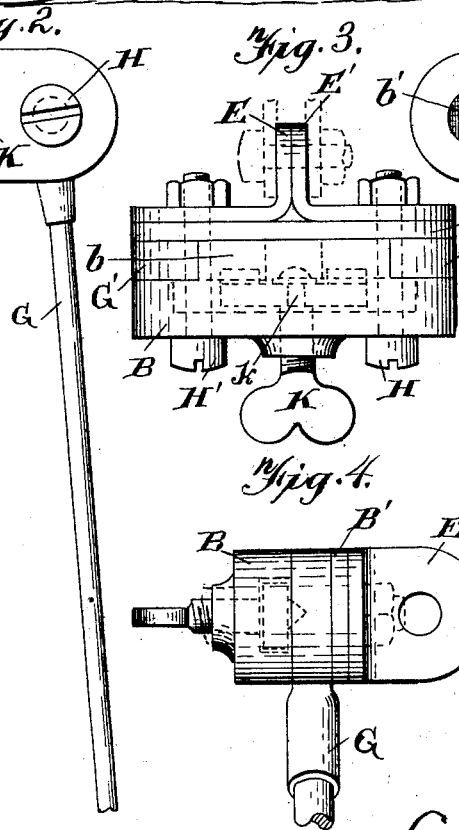
Fig. 3.
Fig. 4.
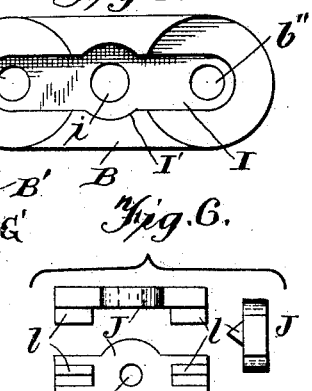
Fig. 5.
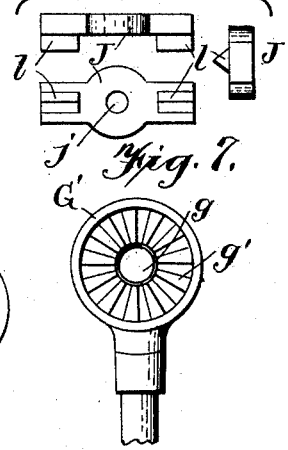
Fig. 6.
Fig. 7.
Witnesses
Geo. E. Frech.
Chas. R. Wright Jr.
Inventor
L. I. Jones,
By A. S. Pattison, Attorney

UNITED STATES PATENT OFFICE.

LEMUEL I. JONES, OF AKRON, OHIO.

BICYCLE-SUPPORT.

SPECIFICATION forming part of Letters Patent No. 715,082, dated December 2, 1902.

Application filed June 9, 1902. Serial No. 110,837. (No model.)

*To all whom it may concern:*

Be it known that I, LEMUEL I. JONES, a citizen of the United States, residing at Akron, in the county of Summit and State of Ohio, have invented new and useful Improvements in Bicycle-Supports, of which the following is a specification.

My invention relates to improvements in bicycle-supports, and pertains more particularly to that class that are secured to and carried by the frame of the bicycle.

The object of my invention is to provide a bicycle-support which can be readily attached to the ordinary bicycle and which is adapted to firmly hold the bicycle in an upright position, whether the ground is level or not, and which is adapted to be folded up against the frame, so that it will not be in the way of the rider.

Another object of my invention is to provide a simple, cheap, and more effective support that can be readily attached to the ordinary bicycle.

In the accompanying drawings, Figure 1 is a perspective view of a bicycle, showing my support in operative position. Fig. 2 is a side view of my support detached from the bicycle. Fig. 3 is a top view of Fig. 2. Fig. 4 is an end view of Fig. 2, showing the holding-dog in dotted lines. Fig. 5 is a side view of one of the clamping-plates. Fig. 6 is a side view of the clamping-dog. Fig. 7 is a side view of the upper portion of one of the supporting-legs.

Referring now to the drawings, A represents the main body of my device, which is made of two plates B and B', and the plate B is provided with the outwardly-extending central portion $b$, against which the plate B' rests, thus leaving a circular space between the plates at each end for the reception of the upper ends of the legs G. The said upper ends of said legs are provided with the enlarged circular portions G', which are provided with a circular opening $g$, and extending from said circular opening are the radially-extending grooves or serrations $g'$, the purpose of which will be hereinafter more fully described. The plate B is provided with openings $b'$ and $b''$ adjacent its ends, and the plate B' is provided with corresponding openings, and passing through said openings and the opening $g$ in the legs are the bolts H and H', by means of which the two plates are held together and upon which the legs or arms are adapted to swing in the arc of a circle. The said legs rest within the spaces left on each side of the outwardly-extending central portion $b$.

Secured to the outer plate B' by the bolts H and H' are the outwardly-extending arms E and E', by means of which my device may be secured to the frame of a bicycle by a clip or in any other desired manner.

The plate B is provided with a central elongated horizontal slot or recess I, which extends from the opening $b'$ to the opening $b''$ and has an enlarged central recess I', and extending from the center of said enlarged recess is a transverse screw-threaded opening $i$. Within said recess I there is a correspondingly-shaped dog J, which fits snugly therein and has its outer ends provided with the laterally-extending teeth $l$ and $l'$, which are adapted to engage the serrations $g$, carried by the enlarged upper portions of the legs G, thus holding them in the desired position. It will be readily seen that the depth of the recess I is greater than the thickness of the dog, thus allowing the dog to be thrown in or out of engagement with the serration of the upper portion of the legs, but preventing any twisting of the dog by the tension of the legs thereon. In order to hold the dog in the desired position, I provide the transverse screw-threaded opening $i$ with a thumb-screw K, which has a reduced outer end $k$ passing through a centrally-located opening $j$ in the dog and its outer end turned over, forming a swiveled connection therewith, whereby the dog can either be thrown in or out of engagement with the serrated portion of the upper end of the legs. It will be readily seen that each leg can be independently adjusted, and by so arranging the legs the support can be readily adjusted to support a wheel whether the ground be level or not.

The operation of my device is as follows: The legs or arms are normally held in a vertical position by the dog and the dog is held by the thumb-screw, and when it is desired to use the support I loosen the thumb-screw, thus releasing the legs and allowing them to swing outwardly and downwardly until they engage the ground, when the thumb-screw is tightened, thereby holding the legs in engagement with the ground, and the bicycle is thus held in the position it had when the legs were lowered.

Having thus described my invention, what I claim, and desire to secure by Letters Patent, is—

1. A bicycle-support comprising a leg-supporting member composed of two horizontal elongated plates, legs pivoted between said plates on separate pivots, an elongated transversely-movable dog between said plates and having engaging surfaces at its outer ends adapted to engage the sides of said legs, substantially as described.

2. A bicycle-support comprising a leg-supporting member, composed of two horizontal elongated plates, legs pivoted between said plates on separate pivots, an elongated transversely-movable dog between said plates and having engaging surfaces at its outer ends adapted to engage the sides of said legs, and a screw-threaded member passing through one of said plates and swiveled to said dog intermediate its length, substantially as described.

3. A bicycle-support comprising a leg-supporting member composed of two plates, legs having enlarged upper ends serrated on one side and pivoted between said plates on separate pivots, one of said plates having an elongated horizontal recess, an elongated dog within said recess, and means for forcing said dog within the serrations, carried by the legs, substantially as described.

4. A bicycle-support, comprising a leg-supporting member composed of two plates, legs having enlarged upper ends serrated on one side, bolts passing through said plates and the enlarged upper ends of the legs, one of said plates having an elongated horizontal recess in its inner face, a dog within said recess and having outer engaging surfaces adapted to engage the serrations of the legs, and means for moving said dog within the recess, substantially as described.

5. A bicycle-support, comprising a leg-supporting member composed of two plates, legs having enlarged upper ends, serrations on one side, a separate bolt passing through the plates, and the enlarged upper ends of the legs, one of said plates having an elongated horizontal recess in its inner face, a dog within said recess and having outer engaging surfaces adapted to engage the serrations of the legs, and an operating-bolt swiveled to said dog and passing through said plate, substantially as described.

6. A bicycle-support comprising a leg-supporting member composed of two plates, legs having enlarged upper ends serrated on one side, bolts passing through said plates and the enlarged upper ends of the legs, one of said plates having an elongated horizontal recess in its inner face, a dog within said recess and laterally-extending elongated members adapted to engage the serrations of the legs, and a screw-threaded bolt passing through said plate and swiveled to said dog, substantially as described.

7. A bicycle-support comprising a leg-supporting member composed of two plates, legs having enlarged upper ends serrated on one side, bolts passing through said plates and the enlarged upper ends of the legs, one of said plates having an elongated horizontal recess having an enlarged central opening in its inner face, a dog within said recess and having an enlarged central portion corresponding to the central opening in the plate, and the outer ends of said dog having laterally-extending elongated members adapted to engage the serrations of the legs, and a screw-threaded bolt passing through said plate and swiveled to the enlarged central portion of said dog, substantially as described.

8. A bicycle-support comprising a leg-supporting member composed of two elongated plates, outwardly-extending attaching members carried by one of said plates, legs having enlarged upper ends serrated on one side, bolts passing through said plates, the attaching members and the enlarged upper ends of the legs, one of said plates having an elongated horizontal recess having an enlarged central opening in its inner face, a dog within said recess and having an enlarged central portion corresponding to the central opening in the plate, and the outer ends of said dog having laterally-extending elongated members adapted to engage the serrations of the legs, and a screw-threaded bolt passing through said plate and swiveled to the enlarged central portion of said dog, substantially as described.

In testimony whereof I have hereunto set my hand in the presence of two subscribing witnesses.

LEMUEL I. JONES.

Witnesses:
E. D. COATES,
C. F. BEERY.